MONAURAL TO STEREO AUTOMATIC SWITCHING SYSTEM
FOR AN FM MULTIPLEX STEREO RADIO RECEIVER

Filed March 12, 1964

INVENTOR.
SAVA W. JACOBSON
BY Elliott & Pastoriza
ATTORNEYS 3,297,825
Patented Jan. 10, 1967

3,297,825

MONAURAL TO STEREO AUTOMATIC SWITCHING SYSTEM FOR AN FM MULTIPLEX STEREO RADIO RECEIVER

Sava W. Jacobson, 17340 Gresham, Northridge, Calif. 91324

Filed Mar. 12, 1964, Ser. No. 351,317
4 Claims. (Cl. 179—15)

Figure 1:
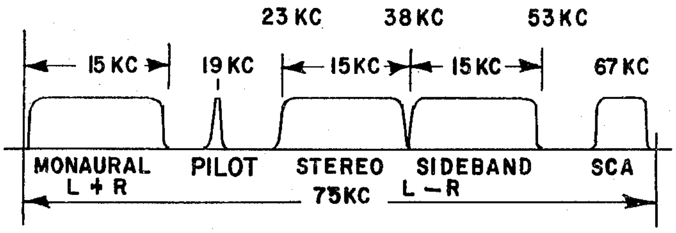

This invention relates to an improved switching system for FM receivers equipped to receive multiplex signals for switching the receiver between monaural and stereo modes of operation. More particularly, the invention has to do with an improved automatic switching means which will carry out this switching function completely automatically in response to the presence of FM multiplex stereo signals.

Present FM multiplex stereo transmissions operate in the following manner: a signal containing the sum of the left and right channel information, hereafter referred to as $L+R$, is broadcast over a 20 c.p.s. to 15 kc. span in an allotted 75 kc. bandwidth. Receivers equipped for only monaural reception thus reproduce the full program content without any degredation or loss of musical information.

To provide stereo, an amplitude-modulated signal centered at 38 kc. and with a 30 kc. bandwidth carries $L-R$ information. This amplitude modulated signal is transmitted when the broadcasting station is transmitting stereo along with the conventional $L+R$ monaural signal. When the 38 kc. signal is demodulated at the receiver by means of a conventional AM detector in a positive sense to provide $+(L-R)$ and added to the $L+R$ monaural signal, the R portion cancels out, leaving only the L signal which is passed to the left output channel. If the 38 kc. signal is simultaneously de-modulated in a negative sense, a $-(L-R)$ signal is obtained. When this latter signal is added to the monaural $L+R$ signal, the L component is cancelled, leaving only the R signal which is passed to the right output channel.

From the foregoing, it will be seen that there exists a very simple means for separating the L and R signals to provide the desired stereophonic reception.

As a further refinement, and in order to conserve transmitter modulation energy, it is standard practice to suppress the 38 kc. carrier signal at the transmitter. To recreate this carrier signal at the receiver, the transmitter broadcasts a pilot signal at one-half carrier frequency (19 kc.), with an energy content of approximately 10 percent of the total modulation level. This 19 kc. signal is separated from all of the other carrier signals in the receiver, is amplified, doubled, and then added to the 38 kc. sidebands in proper phase relationship to form a conventional amplitude-modulated envelope.

The multiplex stereo detector circuit for providing the $L-R$ sideband signal to be added to the $L+R$ signal and the $-(L-R)$ signal to be added to the $L+R$ signal includes first and second de-modulating diodes, connected in opposite directions between a common input junction and the left and right output channels respectively. The sideband information together with the 38 kc. carrier frequency signal and the $L+R$ monaural signal are all applied to the input junction. In other circuits, only the sideband and carrier information is present at the input junction and the $L+R$ monaural signal is added elsewhere in the circuit to be combined with the de-modulated sidebands and provide the desired stereo signals.

It is a characteristic of FM detector circuits that maximum noise rejection is present at or close to the center of their bandwidths. Therefore, in the presence of weak signals, the far ends of the band and in particular the region carrying the multiplex stereo sideband information, are characterized by a noise content approximately 10 times greater than that which is present at the band center. When a receiver is in its "multiplex stereo" mode of operation, such noise is rectified by the referred to first and second demodulation diodes and is added to the signal output even though the receiver may be tuned to a monaural station.

Further, stations normally broadcasting only monaural FM programs may and do use portions of their spectrum above 20 kc. for private subscription communications. Thus, an FM receiver set to receive multiplex stereo broadcasts, when tuned to such a station, may reproduce not only the intended monaural program but, because of the action of the demodulation diodes, portions of the private subscription broadcast resulting in annoying interference.

It is primarily for the above reasons that a switch of some sort, either manual or automatic, is provided in multiplex stereo receivers and it is a function of this switch to cause the receiver to operate in a monaural mode—that is, with the diodes out of the signal path, when monaural stations are to be received. When a stereo station is to be received, the switch is turned to the "multiplex stereo" mode of operation and whatever noise exists in the background, if a weak station is tuned, must be tolerated.

Switches of the foregoing type have been used which are automatic in operation. In other words, a manual switch for switching between the monaural and stereo position is not provided but rather an electronic switch such as a transistor, vacuum tube, or relay, which functions automatically in response to the presence of a stereo station, effects the desired switching operation. Such prior art switches generally work from the recovered 19 kc. pilot signal or the 38 kc. carrier signal. Thus, whenever a stereo broacast is taking place, there is always present the 19 kc. and 38 kc. signal in the receiver and this signal itself is used to operate an electrical switch to switch the receiver to stereo condition.

When a weak signal is being received, however, the 19 kc. pilot may be very weak, and a common failing, or performance problem, exists in that at some small signal level the automatic switch does not "know" whether the signal is monaural or stereo. As a result, the switch keeps shifting back and forth to the annoyance of the listener. In addition, many such switch circuits can be triggered off by wideband noise, since such noise contains, among other components, some 19 kc. information energy. This noise will thus contribute to intermittent switching operations even in the presence of monaural stations when such monaural stations are very weak.

With all of the foregoing considerations in mind, it is accordingly a primary object of this invention to provide a greatly improved automatic switch for switching an FM multiplex stereo radio receiver between monaural and stereo modes of operation, in which the foregoing problems are overcome.

More particularly, it is an object to provide an automatic switch for switching from monaural to stereo operation which avoids the use of elements such as transistors, relays, and the like, which are subject to intermittent operation as a consequence of noise when weak stations are tuned, to the end that the receiver will assume only a monaural condition when a monaural signal is being received and only a stereo condition when a stereo signal is being received.

Another important object is to provide an improved switch meeting the foregoing objects including means for indicating to a listener the presence of a stereo station.

Another important object is to provide an automatic switching means for FM multiplex stereo radio receivers which employs a minimum number of inexpensive components so that both reliability and economy are realized.

Briefly, these and other objects and advantages of this invention are attained by avoiding the use of transistor or relay type switches and instead providing a forward bias on the first and second demodulation diodes in the multiplex stereo circuit portion of the receiver. This forward biasing may be obtained from the normal B+ power supply by intersecting a resistance between the B+ power supply and the diodes such as to provide the forward bias. The arrangement is such that with the forward bias present, the diodes will effectively appear as short circuits unless there is provided at the junction to the diodes the 38 kc. carrier signal which is only present when stereo broadcast is taking place.

In operation, the presence of the 38 kc. carrier signal at the junction point of the diodes will overcome the forward bias provided from the B+ power supply so that the diodes will then function in their normal manner to demodulate the sideband signals and stereo operation will result. However, when the receiver is tuned to a monaural station so that there is not present any 38 kc. carrier, the forward bias will then again function to render the diodes ineffective and thus monaural operation will result.

To insure proper operation when very weak stations are to be received, a reverse bias derived from the 38 kc. signal may be applied to the diodes. Thus, when a stereo broadcast is taking place the 38 kc. signal may be rectified to provide a D.C. voltage level which is applied to the diodes in a reverse manner so as to overcome, in combination with the 38 kc. signal at the input junction, the forward bias. Operation of the diodes in the desired manner for stereo reception will then take place even in fringe areas.

A further feature is realizable by connecting a signaling means such as a neon bulb across the rectifying means for the 38 kc. signal so that this bulb will light and thus signal to a listener whenever a stereo station is being received.

The only component involved is a simple high resistance for providing the forward biasing from the B+ power supply. In the event that the additional reverse bias voltage is to be applied, suitable rectifying means in the form of a capacitor-resistance network would be added. Thus it will be evident that the switching circuitry is very simple and, as a result, reliable and economical.

Figure 2:
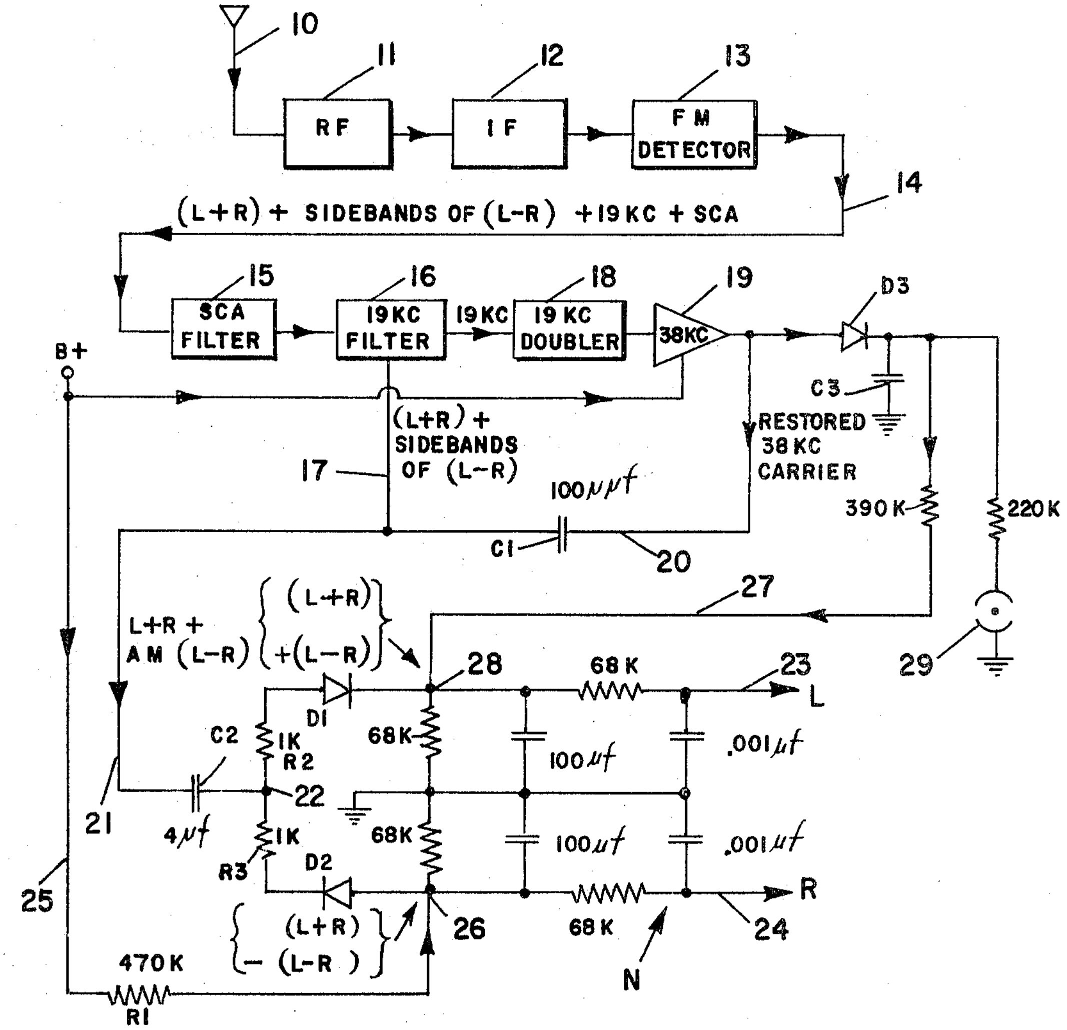

A better understanding of the invention will be had by now referring to one embodiment thereof as illustrated in the accompanying drawings, in which:

FIGURE 1 is a schematic plot of various frequency bands within an allotted 75 kc. FM stereo channel; and, FIGURE 2 is a schematic diagram, partly in block form, illustrating the switching of the present invention.

Referring first to FIGURE 1 there is illustrated a typical 75 kc. channel allotted to an FM transmitting station. A 15 kc. portion of this band indicated to the left in FIGURE 1 includes both the left and right musical information making up a stereo broacast and is designated as an $L+R$ signal. Since this signal includes both the left and right hand musical information summed together, it constitutes a monaural signal with full fidelity and would normally be received by all monaural FM receiving sets.

To provide multiplex stereo as described heretofore, an $L-R$ signal sideband is developed by the transmitter about a center carrier frequency signal of 38 kc., the total bandwidth extending for 15 kc. on either side of the 38 kc. carrier signal as shown in FIGURE 1. As also mentioned heretofore, the 38 kc. carrier is recreated at the receiver by doubling a 19 kc. transmitted pilot signal, also shown in FIGURE 1.

The spectrum of FIGURE 1 is completed by a band designated SCA having a center frequency of 67 kc. This band is for private use, such as specific types of subscription music to be used in commercial establishments and the like.

Referring now to FIGURE 2 there is shown a typical FM multiplex stereo receiving set for providing either monaural or stereo output signals when the receiver is tuned to a station transmitting within the 75 kc. bandwidth illustrated in FIGURE 1.

In FIGURE 2 there is shown a receiving antenna 10, RF detector 11, intermediate frequency channel 12, and FM detector 13. The signals from the detector 13 appear on a line 14 and include the $L+R$ monaural signal, the $L-R$ sidebands, the 19 kc. pilot signal, and the SCA signal. These signals all pass into an SCA filter 15 which will reject the SCA signals. From the filter 15 the remaining signals pass into a 19 kc. filter at 16 having an output 17 which will contain only the $L+R$ monaural signal plus the $(L-R)$ sideband signal. The 19 kc. signal, which is removed from the line 17, in turn is passed to a frequency doubler 18 to provide a 38 kc. carrier signal. This carrier signal is amplified in the amplifier 19 and passed on a line 20 through a high frequency filter condenser C1 to serve as a carrier for the sideband signal $L-R$ on the line 17.

The line 21 extending from the lines 20 and 17 in the lower left portion of FIGURE 2 contains the $L+R$ signal and the amplitude modulated $(L-R)$ 38 kc. carrier signal. These signals are passed through a relatively large capacitance C2 to an input junction 22. First and second demodulating diodes D1 and D2 are connected in opposite directions between the junction 22 and left and right output signal lines 23 and 24 as shown. These output lines in turn lead to the left and right audio amplifiers and speakers (not shown.) The resistance-capacitance network N connected between the output lines 23 and 24 constitutes a simple de-emphasizing circuit for attenuating the high frequency end of the spectrum in the usual manner since this portion of the spectrum is transmitted with higher gain than are the lower frequencies. The net result is a flat frequency response throughout the entire recovered audio band. The de-emphasis network is well known in the art and does not form any part of the present invention.

As indicated by the lettering adjacent the first and second demodulating diodes D1 and D2, the monaural $L+R$ signal will combine with the $L-R$ signal at the output of the diode D1 to provide a signal of only left-hand, or L channel, information. Actually, the output would be 2L when these quantities in parenthesis are added but the attenuation occurring through the de-emphasis network andother resistances in the circuit results in an output signal L of substantially the same magnitude as the original left-hand or L input signal.

Similarly, the $L-R$ signal passing through the reverse or second diode D2, to provide a $-(L-R)$ signal, when combined with the $L+R$ signal will result in a 2R magnitude signal which is attenuated to an R signal on the output line 24. Therefore, when the set is tuned to receive multiplex stereo signals, the left and right hand channel information will be properly separated.

In conventional type monaural operation, the first and second diodes D1 and D2 are switched out of the circuit so that the signal at the junction 22 may be passed through a de-emphasis network directly to both the L and R audio output circuits. As will be recalled from the previous description of FM operation, if the diodes D1 and D2 are not switched out of the circuit during monaural operation, noise or other undesirable signals may be passed by the diodes to the output circuits.

In accordance with the present invention, rather than employing switches of the type used heretofore, the diodes D1 and D2 remain in the circuit but are rendered substantially ineffective during monaural reception. This "switching" operation is effected by applying a forward bias to the diodes D1 and D2. This forward bias is obtained by connecting a line 25 containing a resistor R1 of proper magnitude, approximately 470K in the indicated circuit, to the B+ power supply shown at the upper left of FIGURE 2 and to the diodes at the point 26. This connection provides a biasing current sufficient to bias the normal germanium diodes in the forward direction so that they will have no rectification action. When the diodes are so biased, they act virtually as short circuits. Therefore, the $L+R$ monaural signal at the junction 22 will be applied to both the output lines 23 and 24, the same as though the diodes were completely out of the circuit. Accordingly, the diodes do not detect noise or residual SCA signals, the de-emphasis circuit N at the output of the diodes acts in a manner identical to that which would have occurred had the de-emphasis network been placed at the detector output, and true monaural operation results.

When a stereophonic signal is received, the 38 kc. carrier signal appearing at the junction 22 will set up a counter voltage that opposes the forward bias on the diodes. The diodes D1 and D2 then perform their normal demodulation functions and the separation of the L and R signals will occur as described. When the receiving set is retuned to a monaural station so that the 38 kc. carrier signal at the junction point 22 is absent, the forward biasing supplied by the line 25 will immediately operate to render the diodes ineffective.

In the event a relatively weak FM station is being received, it might be desirable to add small resistances such as 1K resistances R2 and R3 between the input junction 22 and the first and second diodes D1 and D2 respectively. These small resistances will prevent any inadvertent operation of the diodes D1 and D2 during monaural operation should any 38 kc. carrier of a small amount appear at the junction point 22. In other words, a given threshold level of the 38 kc. signal must be exceeded when the small resistances R2 and R3 are present to buck out the effect of the forward bias on the diodes D1 and D2.

In accordance with a further feature of the invention, and to insure stereo operation for relatively weak stations, a portion of the 38 kc. carrier signal from the amplifier 19 may be rectified by a diode D3 and filtered by a suitable long time constant condenser C3 to provide a rectified output of approximately 100 volts on a line 27. This signal is applied as at 28 to the rear of the diode D1 to provide a reverse bias on the diodes D1 and D2 which substantially cancels out the bias applied at the point 26 from the B+ power supply. Since the rectified signal on the line 27 will only be present when a 38 kc. signal is present, the latter only being present when a stereo broadcast is in effect, the diodes will only be rendered ineffective by the signal at the point 28 when an FM station is being received. It should be understood that the presence of the 38 kc. rectified signal at the point 28 operates in combination with the 38 kc. signal at the junction 22 in overcoming the forward bias applied at the point 26. The addition of the rectified 38 kc. carrier signal at the point 28 merely insures that the diodes D1 and D2 will operate when the set is located in fringe areas wherein the 38 kc. carrier signal may be relatively weak.

The rectified 38 kc. carrier signal may conveniently be used to energize a neon bulb such as indicated at 29 in the right hand portion of FIGURE 2. Thus, when the neon bulb 29 is energized, the person operating the receiver will know that an FM stereo broadcast is being received.

From the foregoing description, it will be evident that the present invention has thus provided a greatly improved and unique switching system for FM receivers. Not only is the switching effected completely automatic so that manual switches are avoided, but the switching circuit design is such that intermittent operation as a consequence of noise is avoided. In other words, any noise present which may include 38 kc. signals or 19 kc. signals during monaural operation is not sufficient to overcome the forward bias on the diodes D1 and D2.

While only one particular type of FM multiplexing stereo receiving circuit has been described, it will be understood by those skilled in the art that the "switching" circuit wherein a forward bias is applied to the demodulating diodes in the multiplexing stereo detector portion of the circuit is applicable to other FM circuits. The invention accordingly is not to be thought of as limited to the one embodiment set forth merely for illustrative purposes.

What is claimed is:

1. A monaural to stereo automatic switching system for an FM multiplex stereo radio receiver having a B+ power source when energized and having first and second side band detector diodes connected in opposite directions between a stereo carrier frequency input junction and left and right signal output lines respectively, comprising: a high resistance having one end connected to said B+ power source and its other end connected to said diodes to provide a forward bias on said diodes of sufficient magnitude that the same electrically appear as substantially short circuits in the absence of a stereo carrier frequency at said input junction whereby said diodes are effectively no longer part of the FM multiplex stereo detector circuit until such time as a stereo carrier frequency signal appears at said junction, said carrier frequency signal overcoming said forward bias to cause said diodes to perform their demodulating function in a normal manner to provide stereo signals to said left and right output lines; and a rectifier means having its input connected to receive said carrier frequency signal and its output connected to said diodes to provide a D.C. reverse bias derived from and in response to said carrier frequency signal on said diodes of sufficient magnitude to insure, in combination with said carrier frequency signal at said junction, positive cancelling out of the forward bias on said diodes so that said diodes perform their demodulating function in a normal manner when said carrier signal is present even in fringe areas.

2. A system according to claim 1, including first and second small resistances connected respectively between said junction and said first and second diodes so that a given threshold value of said carrier frequency signal must be exceeded before overcoming said forward bias on said diodes.

3. A system according to claim 1, including a signaling means connected to the output of said rectifier means and responsive to the presence of said carrier frequency signal to indicate reception of stereo signals.

4. A system according to claim 3, in which said signaling means comprises a neon bulb.

References Cited by the Examiner

UNITED STATES PATENTS

| | | | |
|---|---|---|---|
| 3,167,615 | 1/1965 | Wilhelm et al. | 179—15 |
| 3,187,102 | 6/1965 | Gschwandtner | 179—15 |
| 3,225,143 | 12/1965 | Parker | 179—15 |

DAVID G. REDINBAUGH, *Primary Examiner.*

ROBERT L. GRIFFIN, *Examiner.*